March 10, 1970   J. J. PIROS   3,499,632
MIXING APPARATUS
Filed Feb. 8, 1968

INVENTOR
JOHN J. PIROS

BY McLean, Morton, & Boustead

ATTORNEYS.

3,499,632
MIXING APPARATUS

John J. Piros, Homewood, Ill., assignor to Sinclair Research, Inc., New York, N.Y., a corporation of Delaware
Filed Feb. 8, 1968, Ser. No. 703,917
Int. Cl. B01f *15/04, 5/12*
U.S. Cl. 259—4               2 Claims

---

ABSTRACT OF THE DISCLOSURE

A method of and an apparatus for forming an emulsion having a uniform consistency and in which the component ratios can be carefully controlled. A first liquid, for instance, oil, is delivered as dispersed drops into a mixing area at a determined flow rate and in a first direction. A second liquid, such as water, in which the first liquid is emulsifiable, is delivered into the mixing area at a determined flow rate and in a second direction counter to the first direction. The resulting emulsion can be passed through a filter to break up remaining globules of liquid.

---

This invention pertains to the emulsification of liquids, such as a "water-soluble" oil in water. More particularly, this invention pertains to an apparatus for and a method of emulsifying such liquids to provide an emulsion having a uniform consistency and an accurately controlled ratio of ingredients.

Many industrial processes include the emulsifying of one liquid in another. Although the present invention is described with reference to an emulsion of a "water-soluble" oil in water, it is applicable to emulsions formed of other liquids. Among the industrial processes utilizing as a lubricant an emulsion of oil in water are glass molding and metal working. Industrial methods for making emulsions of water-soluble oils in water vary widely. Perhaps the simplest method comprises measuring the oil in a container such as a bucket, pouring the oil into a vat of water and stirring the mixture. A more refined method comprises introducing the oil into a water stream with a pump. Such methods produce emulsions of varying uniformity in which the ratio of components often cannot be accurately controlled.

The present invention is an apparatus for emulsifying one liquid, e.g. an oleaginous material such as a "water-soluble" oil, in a second liquid, e.g. water, in which the components can be accurately controlled and in which the resulting emulsion has a uniform consistency. In accordance with the present invention a metered amount of the dispersed phase of the emulsion, e.g. a "water-soluble" oil, is sprayed or jetted as dispersed drops or particles into a flowing, measured amount of the solid phase of the emulsion, for instance water, to produce an emulsion having the desired characteristics. Oil can be pumped at the desired pressure from a supply reservoir, through a needle valve to a metering orifice which jets or sprays the oil as drops or fine particles into a stream of water flowing at a determined rate in a direction counter to the direction of the oil spray. To further complete the emulsification, the emulsion can be passed through a filter having, for example, a cotton or other fibrous filter element. During passage through this filter remaining globules of oil are broken up.

Figure 1:
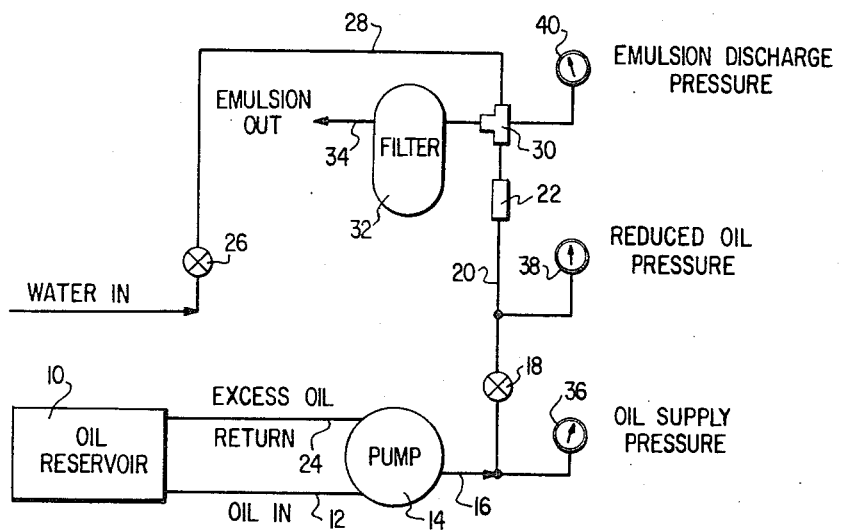
Figure 2:
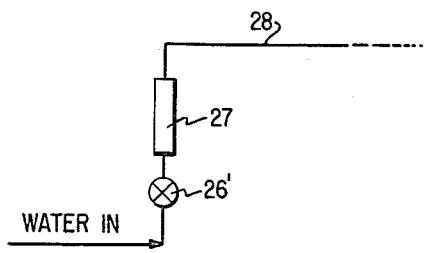

These and other aspects and advantages of the present invention are apparent in the following detailed description and claims, particularly when read in conjunction with the accompanying drawings in which:

FIGURE 1 is a flow diagram depicting one embodiment of the present invention; and FIGURE 2 is a fragmentary flow diagram depicting a modification to the embodiment of FIGURE 1.

Oil from reservoir 10, e.g. a soluble oil composed mainly of mineral lubricating oil, and minor amounts of emulsifiers and a small amount of water, flows through oil inlet tubing 12 under the urging of pump 14 which supplies the oil through tubing 16 to valve 18. By way of examples, the tubing utilized in this apparatus might be conventional hydraulic tubing, valve 18 might be a needle valve, and pump 14 might be a boost pump such as found on a conventional oil burner but having no blower. An internal by-pass in such a pump limits the output oil elevated pressure to any desired valve, for example 100 p.s.i.

Valve 18 is adjusted so that oil leaves it to enter tubing 20 at the desired pressure. Tubing 20 passes the oil to metering orifice 22 which controls the flow rate of the oil. Excess oil brought from reservoir 10 by pump 14 is returned to the reservoir through tubing 24. Metering orifice 22 might be a conventional oil burner nozzle. The amount of oil delivered by orifice 22 can be controlled by adjusting the size of the orifice and by adjusting the pressure prior to the orifice by means of valve 18.

Water from a source (not shown) passes through constant flow valve 26 which delivers water as a continuous liquid phase at a constant flow rate regardless of minor fluctuations in water pressure. The water is then delivered by tubing 28 into mixing area 30. Orifice 22 delivers the oil in a spray or jet into mixing area 30 in counterflow to the water. By way of example, mixing area 30 might be a T joint, having the water and oil introduced in counterflow into the top of the T and delivering the resulting emulsion from the base of the T.

The resulting emulsion has a uniform consistency due to the thorough mixing resulting from the counterflow. Valves 18 and 26 and metering orifice 22 permit control of the ratio of the oil and water in the emulsion. Constant flow valve 26 delivers a preset amount of water to mixing area 30. Valve 18 and metering orifice 22 can be adjusted to deliver the required amount of oil to mixing area 30 to give an emulsion having the desired component ratio. Alternatively, as shown in FIGURE 2, a needle valve 26' can be utilized to pass water at a known pressure to means such as a rotameter 27 to supply water at a known rate to mixing area 30 via tubing 28.

If desired to further improve emulsification, the emulsion from T joint 30 can be passed through filter 32, which for example might have a cotton filter element to insure that the oil in the emulsion passing through it intimately contacts the filter. As a result, globules of oil within the emulsion are broken up during passage through the filter prior to delivery through tubing 34.

Pressure gauges can be included to indicate the pressure at various points in the system. Thus, pressure gauge 36 indicates the pressure of the oil leaving pump 14, pressure gauge 38 indicates the pressure of the oil after passage through valve 18, and pressure gauge 40 indicates the pressure of the emulsion in mixing area 30.

Apparatus in accordance with the present invention has been found capable of producing uniform emulsions with various oils and water and having accurately controlled water to oil ratios of from five to upwards to one thousand to one. Although the present invention has been described with reference to preferred embodiments, numerous modifications could be made without departing from the scope of the invention.

What is claimed is:

1. Apparatus for forming an emulsion from first and second liquids comprising:
    (a) first conduit means adapted for connection to a source of a first liquid;

(b) constant flow valve means coupled to said first conduit means for regulating the liquid flow rate in said first conduit means to a substantially constant value regardless of minor liquid pressure fluctuations;

(c) a T joint defining a mixing area and having an outlet;

(d) second conduit means coupling said constant flow valve means to said T joint for passing the first liquid into the said mixing area in a first direction and in a continuous phase;

(e) third conduit means adapted for connection to a source of a second liquid;

(f) a boost pump coupled to said third conduit means for urging liquid through said third conduit means and including internal bypass means for limiting the output liquid pressure therefrom to a preset value;

(g) fourth conduit means coupled to said pump for receiving the second liquid therefrom, said fourth conduit means including a needle valve for limiting the second liquid pressure to a second preset value;

(h) fifth conduit means coupled to said pump and adapted for connection to the second liquid source for returning to the second liquid source excess liquid brought therefrom by said pump;

(i) a nozzle coupling said fourth conduit means to said T joint for spraying the second liquid as a dispersed phase into said mixing area in a second direction counter to said first direction to cause emulsifying of said liquids;

(j) filter means coupled to said T joint outlet and including a cotton filter element for further emulsifying liquids passed therethrough; and (k) discharge means coupled to said filter means for discharging emulsified liquids.

2. Apparatus as claimed in claim 1 in which said constant flow valve means includes a needle valve and a rotameter.

References Cited

UNITED STATES PATENTS

| | | | |
|---|---|---|---|
| 1,330,174 | 2/1920 | De Cew | 259—18 XR |
| 1,578,187 | 3/1926 | Bullock et al. | 259—18 |
| 2,509,288 | 5/1950 | Brochner | 259—4 |
| 2,600,733 | 6/1952 | Clift | 259—4 |
| 2,633,859 | 4/1953 | Klosse | 259—4 XR |
| 2,645,463 | 7/1953 | Stearns | 259—4 |
| 2,671,645 | 3/1954 | Buis | 259—4 XR |
| 2,692,764 | 10/1954 | Hanson | 259—4 |
| 3,129,926 | 4/1964 | Hodges | 259—4 |
| 3,334,868 | 8/1967 | Lage | 259—4 |
| 1,927,496 | 9/1933 | Hilgerink | 252—312 X |
| 2,557,841 | 6/1951 | Preusser | 259—95 |
| 2,684,949 | 7/1954 | McMillan et al. | 252—312 X |
| 2,692,798 | 10/1954 | Hicks | 259—95 X |
| 2,971,748 | 2/1961 | Ellegast | 259—95 X |

WALTER A. SCHEEL, Primary Examiner

J. M. BELL, Assistant Examiner

U.S. Cl. X.R.

259—95; 252—312